F. W. ERICKSON.
CONNECTING LINK OR SHACKLE.
APPLICATION FILED JAN. 29, 1921.
1,399,946.
Patented Dec. 13, 1921.
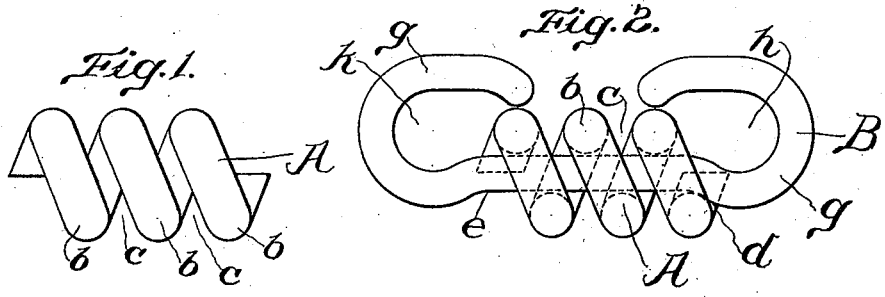
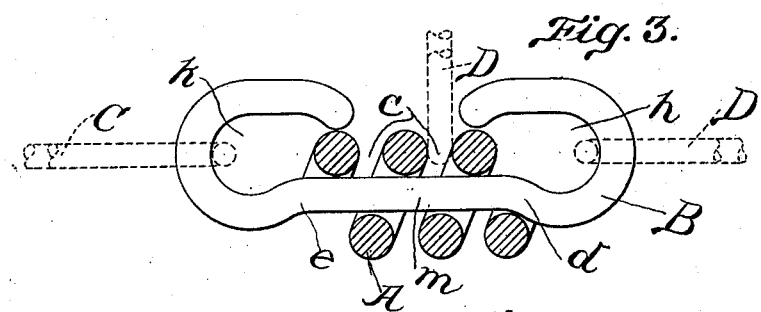
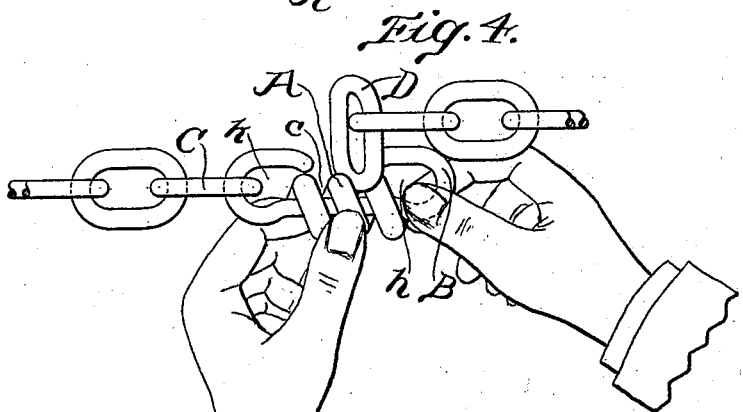
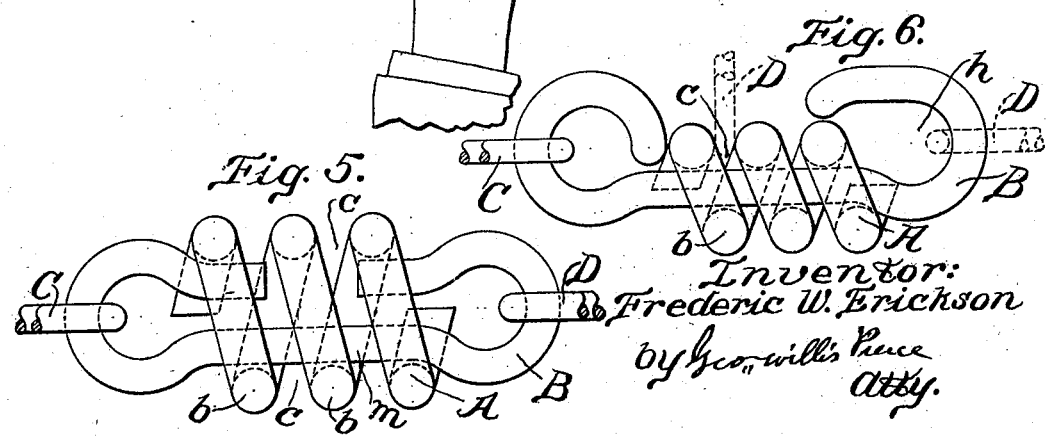
Inventor:
Frederic W. Erickson
by Geo. Willis Pierce
Atty.

UNITED STATES PATENT OFFICE.

FREDERIC WILLIAM ERICKSON, OF NEW YORK, N. Y.

CONNECTING LINK OR SHACKLE.

1,399,946.  Specification of Letters Patent.  Patented Dec. 13, 1921.

Application filed January 29, 1921. Serial No. 440,923.

*To all whom it may concern:*

Be it known that I, FREDERIC WM. ERICKSON, a citizen of the United States, residing at New York, in the county of New York and State of New York, have invented certain Improvements in Connecting Links or Shackles, of which the following is a specification.

This invention relates to an improvement in the means employed for connecting links or shackles between the separate or severed ends of chains, and for especial use in repairing small chains such as are commonly applied to automobile tires to prevent skidding.

It is well known by automobile operators that the links of the chains coming in contact with the ground surface wear through rapidly, and the invention supplies a ready means for quickly making the chain repair without the use of tools.

The linking device furthermore is designed so that a plurality of them may be coupled together to form a chain.

I will now describe the invention and its application in detail, referring to the accompanying drawing in which Figures 1 and 2 are views of the detached and the assembled parts of the device respectively. Fig. 3 is an enlarged side view partly in section. Fig. 4 is a view illustrating the method of linking or connecting the ends of one or two chains by means of the device, and Figs. 5 and 6 are side views of two modifications of the invention.

Referring to Figs. 1, 2, 3 and 4, A is a metal wire spiral whose open or separated convolutions *b* are constructed on a common axis or center, evenly spaced as *cc* from each other sufficiently to permit of the travel of the end links of the chain to be joined. B is a double-ended hook formed by passing a length of wire or rod through the center of the spiral A and bending its ends into the hooks *g* whose open ends will permit the spiral to pass or slide freely, but whose off-sets *e* and *d* will keep it on the straight part *m* and restrict its end movement.

Figs. 3 and 4 illustrate the mode of linking the end links of chain C and D in which chain C is represented with its end link permanently in the loop or orifice K, and the end link of the chain D is shown at the start of assembly. Now, holding the hook B and placing the end of chain D between two convolutions *bb* in a space *c* and turning or revolving the spiral A in the proper direction it will lead the said end of D into the orifice *h*, as shown in Fig. 3, in dotted lines, thus joining or linking the separated ends C D of the same or of two different chains.

In Fig. 5 the spiral A is so large in diameter that the ends thereof are capable of riding upon the ends of the hooks; the method of connection with end links of a chain are as previously described.

In Fig. 6, the end of chain C is shown linked in the closed end of the part B, while end link D is represented as entering a space *c* between convolutions *b* of the spiral A, and by turning the spiral in the right direction the link D is carried into the loop *h* as shown in dotted lines.

The device provides means whereby the opposite fragments or ends of a broken or severed chain, or the ends of two separate chains, may be united, the spiral A being a locking means to hold the chain ends in place and from separating.

I claim as my invention:—

1. A connecting link or shackle to unite the separated ends or sections of chain, comprising a wire or bar whose ends are turned inward toward each other with a spiral located on said wire or bar and between the said ends, and rotatable thereon but without endwise movement.

2. A link or shackle adapted to connect the ends or sections of chains composed of a wire or bar having its ends turned over and inward to form loops, providing an offset between the central part and each end loop, with a spiral on the central part having open convolutions.

3. A link or shackle adapted to connect the ends or sections of chains or articles with linking ends, composed of a central straight part, and turned over hooking ends with a spiral on the straight part arranged to be revolved therein constructed with open or separated convolutions.

4. A link or shackle for the purpose set forth consisting of two members, one member having open loops connected to each other with a spiral member supported on the connection and rotatable therein without end movement.

In testimony whereof I have signed my name to this specification in the presence of two subscribing witnesses, this 26th day of January, 1921.

FREDERIC WM. ERICKSON.

Witnesses:
S. W. ERICKSON,
LEILA H. ERICKSON.